(12) United States Patent
Halim et al.

(10) Patent No.: US 11,822,628 B2
(45) Date of Patent: Nov. 21, 2023

(54) AUTHENTICATION PROFILES FOR USERS

(71) Applicant: Hewlett-Packard Development Company, L.P., Spring, TX (US)

(72) Inventors: Irwan Halim, Spring, TX (US); Josue Villarreal, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 296 days.

(21) Appl. No.: 17/045,527

(22) PCT Filed: Jul. 20, 2018

(86) PCT No.: PCT/US2018/042979
§ 371 (c)(1),
(2) Date: Oct. 6, 2020

(87) PCT Pub. No.: WO2020/018108
PCT Pub. Date: Jan. 23, 2020

(65) Prior Publication Data
US 2021/0165861 A1    Jun. 3, 2021

(51) Int. Cl.
*G06F 21/31* (2013.01)
*G06F 9/445* (2018.01)

(52) U.S. Cl.
CPC ............ *G06F 21/31* (2013.01); *G06F 9/4451* (2013.01); *G06F 9/44594* (2013.01)

(58) Field of Classification Search
None
See application file for complete search history.

(56) References Cited

U.S. PATENT DOCUMENTS

| | | | |
|---|---|---|---|
| 7,080,077 B2 | 7/2006 | Ramamurthy et al. | |
| 7,200,804 B1 | 4/2007 | Khavari et al. | |
| 7,260,724 B1 | 8/2007 | Dickinson et al. | |
| 7,676,829 B1 | 3/2010 | Gui et al. | |
| 8,380,676 B1 * | 2/2013 | Eastham | G06F 16/125 707/694 |
| 9,106,642 B1 | 8/2015 | Bhimanaik | |
| 9,391,988 B2 | 7/2016 | Cronin | |
| 9,391,990 B2 | 7/2016 | Grigg et al. | |
| 9,400,893 B2 | 7/2016 | Tseng et al. | |
| 9,509,676 B1 | 11/2016 | Johnson et al. | |
| 9,509,702 B2 | 11/2016 | Grigg et al. | |
| 9,547,762 B2 | 1/2017 | Lu et al. | |
| 10,872,152 B1 * | 12/2020 | Martel | G06F 21/31 |
| 2006/0075224 A1 | 4/2006 | Tao | |
| 2007/0028117 A1 | 2/2007 | Wong | |
| 2010/0306173 A1 * | 12/2010 | Frank | G06F 9/45558 718/1 |

(Continued)

FOREIGN PATENT DOCUMENTS

WO    2019/204045 A1    10/2019

*Primary Examiner* — James R Turchen
(74) *Attorney, Agent, or Firm* — Quarles & Brady LLP

(57) ABSTRACT

In an example implementation according to aspects of the present disclosure, a method may include receiving, at a computing device, an attempt to authenticate a user via an authentication event and, upon validating the authentication event used, determining which authentication profile to initiate for the user to use the computing device. As an example, the computing device then initiates the determined authentication profile to launch a customized set of programs on the computing device for the user.

14 Claims, 3 Drawing Sheets

(56) References Cited

U.S. PATENT DOCUMENTS

| | | | |
|---|---|---|---|
| 2011/0225625 A1* | 9/2011 | Wolfson | H04L 63/205 726/1 |
| 2014/0109243 A1* | 4/2014 | Ting | G06F 21/60 726/30 |
| 2014/0282931 A1* | 9/2014 | Protopapas | B60R 25/2081 726/5 |
| 2015/0281227 A1 | 10/2015 | Fox Ivey et al. | |
| 2015/0324067 A1* | 11/2015 | Cabral | G06F 9/451 715/811 |
| 2016/0065554 A1* | 3/2016 | Brown | H04L 63/20 726/1 |
| 2016/0088120 A1* | 3/2016 | Bala | G06F 16/9035 707/803 |
| 2018/0332063 A1* | 11/2018 | Ford | H04L 67/535 |
| 2019/0068748 A1* | 2/2019 | Abdel-Maguid | H04L 51/42 |
| 2019/0124066 A1* | 4/2019 | Peddada | H04L 63/0838 |
| 2019/0141047 A1* | 5/2019 | Lee | H04L 63/102 |
| 2019/0187799 A1* | 6/2019 | Tam | G06F 3/017 |

* cited by examiner

AUTHENTICATION PROFILES FOR USERS

BACKGROUND

Upon logging into computing devices, a user may perform routine operations, such as launching applications, websites, remote sessions, or other configurations. Similarly, prior to logging off from the computing device, the user may choose to close active applications, websites, and remote sessions, particularly for security purposes. With regards to security, this may be particularly useful when multiple users access a computing device.

DETAILED DESCRIPTION

Examples disclosed herein provide the ability to automatically perform tasks on a computing device upon user authentication, or when the user is signing off, according to an example. By automating such tasks, routine operations generally performed by the user manually may be avoided, essentially saving time and increasing productivity, improving the overall user experience. As an example, users may choose to log into a computing device via various authentication events, such as a smart card, NFC capable device/card, biometric scan, or facial recognition. As will be further described, each authentication event used by a user may have its own authentication profile to handle a customized set of tasks when the user is logging into or logging off from a computing device. As a result, based on the authentication event used by the user, a unique experience may be provided to the user upon logging into the computing device.

Figure 1:
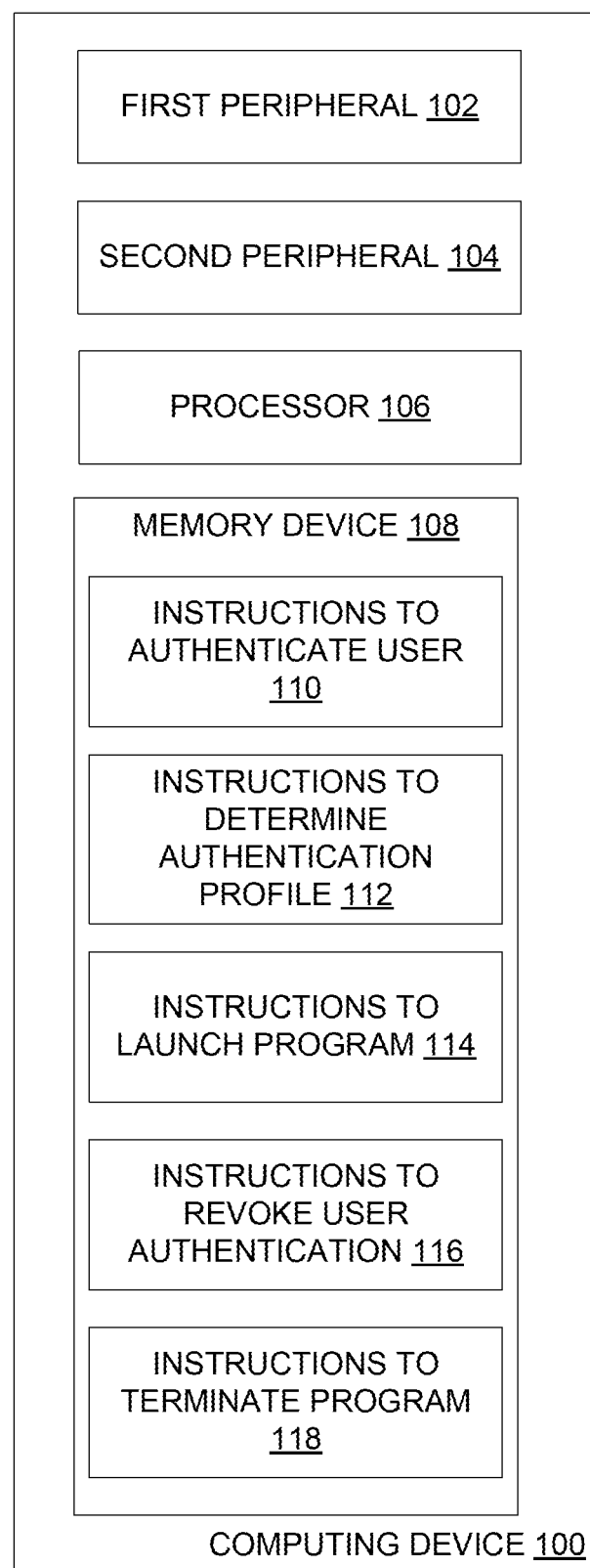
FIG. 1 illustrates a computing device for authenticating a user via an authentication event, and performing a set of tasks based on the authentication event used, according to an example.

With reference to the figures, FIG. 1 illustrates a computing device 100 for authenticating a user via an authentication event, and performing a set of tasks based on the authentication event used, according to an example. The computing device includes at least a first peripheral 102 and second peripheral 104, to authenticate the user via different authentication events, as will be further described. As an example, based on the peripheral used to authenticate the user, a customized set of tasks may be initiated. The computing device 100 depicts a processor 106 and a memory device 108 and, as an example of the computing device 100 performing its operations, the memory device 108 may include instructions 110-118 that are executable by the processor 106. Thus, memory device 108 can be said to store program instructions that, when executed by processor 106, implement the components of the computing device 100. The executable program instructions stored in the memory device 108 include, as an example, instructions to authenticate user (110), instructions to determine authentication profile (112), instructions to launch program (114), instructions to revoke user authentication (116), and instructions to terminate program (118).

Instructions to authenticate user (110) represent program instructions that when executed by the processor 106 cause the computing device 100 to receive an attempt to authenticate a user via an authentication event. As mentioned above, the computing device 100 includes a peripheral, such as first peripheral 102 or second peripheral 104, to authenticate a user via an authentication event corresponding to the peripheral. For example, if the peripheral is a smart card reader, the authentication event may correspond to an insertion or tap of a smart card. If the peripheral involves biometric measurements (e.g., fingerprint scanner, iris scanner), the authentication event may correspond to biometric identifiers, such as a fingerprint, facial recognition, or iris recognition. If the peripheral is an NFC receiver, the authentication event may correspond to the use of an NFC capable device/card. Upon receiving the attempt to authenticate the user via the authentication event, the computing device 100 determines whether the authentication is a valid attempt for allowing access of the computing device 100 to the user. Although a first peripheral 102 and second peripheral 104 is illustrated, the number of peripherals available on the computing device 100 may vary.

Instructions to determine authentication profile (112) represent program instructions that when executed by the processor 106 cause the computing device 100, upon validating the authentication event used, to determine which authentication profile to initiate, for the user to use the computing device 100. As an example, the determination of the authentication profile to initiate includes selecting an authentication profile based on the authentication event used. For example, if a smart card is used to authenticate the user, a first authentication profile may be initiated. If a biometric identifier is used, a second authentication profile may be initiated. As an example, each biometric measurement may have its own authentication profile. For example, the authentication profile initiated if a fingerprint scanner is used may be different from the authentication profile initiated if an iris scanner is used. If an NFC capable device/card is used, a third authentication profile may be initiated. As will be further described, each authentication profile for a user may include a unique set of start and exit tasks while using the computing device 100.

Instructions to launch program (114) represent program instructions that when executed by the processor 106 cause the computing device 100 to initiate the determined authentication profile to launch a customized set of programs or tasks on the computing device 100 for the user. As mentioned above, various authentication profiles may be initiated for a user, based on the authentication event used. For example, a first authentication profile is initiated when a first authentication event is used, and a second authentication profile is initiated when a second authentication event is used. As the set of programs or tasks launched for each authentication profile is different, the customized set of programs launched when the first authentication profile is initiated is different from the customized set of programs launched when the second authentication profile is initiated. As a result, based on the authentication event used by the user, a unique experience may be provided to the user upon logging into the computing device 100. In addition, when more secure authentication events are used, for example, reserved only for administrators, the customized set of programs may include more secure programs and tasks.

As an example, the customized set of programs or tasks includes a predefined set of applications, remote sessions, and/or websites to launch upon the user logging into the computing device 100. For programs requiring user credentials, such as an application or remote session, the authentication profile may also pass through the authentication information of the user, in order for the application or remote session to load properly. As an example, if the application or remote session supports pass through credentials, an authentication token may be passed through to this application or remote session, once the authentication profile is initiated. Once the customized set of programs or tasks are launched on the computing device 100, including the programs that require pass through credentials, the computing device 100 is ready for use by the user, with the routine programs used by the user loaded.

Instructions to revoke user authentication (116) represent program instructions that when executed by the processor 106 cause the computing device 100 to receive an attempt to revoke user authentication. As an example, the attempt to revoke user authentication may correspond to a second instance of the authentication event described above. For example, attempt to revoke user authentication may correspond to a second insertion or tap of a smart card, a second use of a biometric identifier, such as a fingerprint, facial recognition, or iris recognition, or a second tap of an NFC capable device/card on an NFC receiver. However, an authentication event besides the one used initially may be used when attempting to revoke user authentication. However, if the user forgets to revoke user authentication, it may be revoked, for example, after a certain period of inactivity, or when a presence sensor has detected that the user has left the vicinity of the computing device 100. Similarly, if a second user attempts to log into the computing device 100, for example, while the initial user is still logged in, user authentication of the initial user may be revoked, for security purposes.

Instructions to terminate program (118) represent program instructions that when executed by the processor 106 cause the computing device 100, upon receiving the attempt to revoke the user authentication, to terminate the customized set of programs, or any programs that remain open. Automatically closing active applications, remote sessions, and websites, for example, when a user leaves or logs out from the computing device 100, improves overall security. As an example, terminating the customized set of programs includes signing out of the programs from the customized set of programs requiring user credentials, as described above. For example, if an application or remote session supports it, the computing device 100 may request or pass through a sign-out event to the respective application or remote session (e.g., Sending ExitWindows, log off event for remote desktop protocol (RDP), or custom windows message to a windows application). As an example, if applications are manually launched by the user, they may not be affected by the revoking of the user authentication. As an example, upon terminating the customized set of programs, the computing device 100 may initiate local operating system (OS) events such as logoff, restart, shutdown, and lock.

Memory device 108 represents generally any number of memory components capable of storing instructions that can be executed by processor 106. Memory device 108 is non-transitory in the sense that it does not encompass a transitory signal but instead is made up of at least one memory component configured to store the relevant instructions. As a result, the memory device 108 may be a non-transitory computer-readable storage medium. Memory device 108 may be implemented in a single device or distributed across devices. Likewise, processor 106 represents any number of processors capable of executing instructions stored by memory device 108. Processor 106 may be integrated in a single device or distributed across devices.

Further, memory device 108 may be fully or partially integrated in the same device as processor 106, or it may be separate but accessible to that device and processor 106.

In one example, the program instructions 110-118 can be part of an installation package that when installed can be executed by processor 106 to implement the components of the computing device 100. In this case, memory device 108 may be a portable medium such as a CD, DVD, or flash drive or a memory maintained by a server from which the installation package can be downloaded and installed. In another example, the program instructions may be part of an application or applications already installed. Here, memory device 108 can include integrated memory such as a hard drive, solid state drive, or the like.

Figure 2:
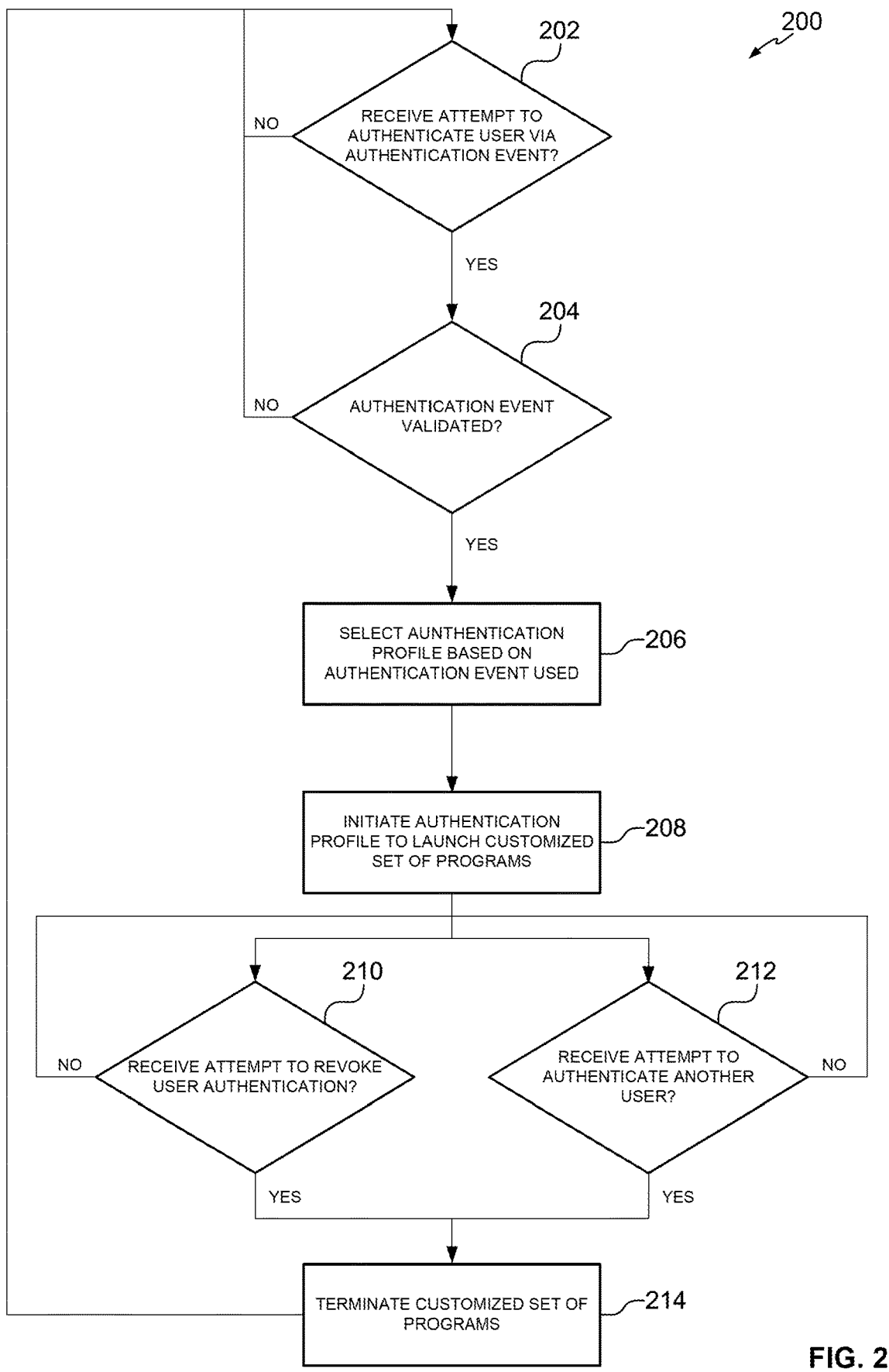
FIG. 2 illustrates a method at a computing device for authenticating a user via an authentication event, according to an example.

FIG. 2 illustrates a method 200 at a computing device for authenticating a user via an authentication event, according to an example. In discussing FIG. 2, reference may be made to the example computing device 100 illustrated in FIG. 1. Such reference is made to provide contextual examples and not to limit the manner in which method 200 depicted by FIG. 2 may be implemented.

Method 200 begins at 202, where the computing device receives an attempt to authenticate a user via an authentication event. Referring to computing device 100, the computing device 100 includes a peripheral, such as first peripheral 102 or second peripheral 104, to authenticate a user via an authentication event corresponding to the peripheral.

At 204, upon receiving the attempt to authenticate the user via the authentication event, the computing device determines whether the authentication is a valid attempt for allowing access of the computing device to the user. If the authentication event is not validated, method 200 returns to 202.

Otherwise, method 200 proceeds to 206, where the computing device selects an authentication profile based on the authentication event used at 202. For example, if the authentication event corresponds to an insertion or tap of a smart card, a first authentication profile may be initiated. If the authentication event corresponds to biometric identifiers, such as a fingerprint, facial recognition, or iris recognition, a second authentication profile may be initiated. If the authentication event corresponds to the use of an NFC capable device/card, a third authentication profile may be initiated.

At 208, the computing device initiates the authentication profile to launch a customized set of programs or tasks. As mentioned above, various authentication profiles may be initiated for a user, based on the authentication event used. As a result, based on the authentication event used by the user, a unique experience may be provided to the user upon logging into the computing device 100. As an example, the customized set of programs or tasks includes a predefined set of applications, remote sessions, and/or websites to launch upon the user logging into the computing device. For programs requiring user credentials, such as an application or remote session, the authentication profile may also pass through the authentication information of the user, in order to seamlessly log in to the application or remote session. As an example, if the application or remote session supports pass through credentials, an authentication token may be passed through to this application or remote session, once the authentication profile is initiated.

Once the customized set of programs or tasks are launched on the computing device, including the programs that require pass through credentials, the computing device is ready for use by the user, with the routine programs used by the user loaded. The computing device remains available for the user until the user authentication is revoked. As an example, user authentication may be revoked by the user itself or when another user attempts to log into the computing device. Referring to method 200, at 210, the computing device determines whether it receives an attempt to revoke user authentication, for example, by the user. At 212, the computing device determines whether it receives an attempt to authenticate another user, for example, by the other user attempting to authenticate itself via an authentication event, as described above. If neither attempt is received at 210 or 212, the computing device remains logged in for the original user. However, as an example, if the user forgets to revoke user authentication, the computing may be revoke the user authentication, for security purposes, for example, after a certain period of inactivity at the computing device, or when a presence sensor has detected that the user has left the vicinity of the computing device.

At 214, if the computing device receives either an attempt to revoke user authentication at 210 or an attempt to authenticate another user at 212, the computing device terminates the customized set of programs, or any programs that remain open, and then returns to 202. Automatically closing active applications, remote sessions, and websites, for example, when a user leaves or logs out from the computing device, improves overall security. Examples include cleaning up the browsing history, application history, and deleting temporary files. As an example, terminating the customized set of programs includes signing out of the programs from the customized set of programs requiring user credentials, as described above. In addition, upon terminating the customized set of programs, the computing device may initiate local OS events such as logoff, restart, shutdown, and lock.

Figure 3:
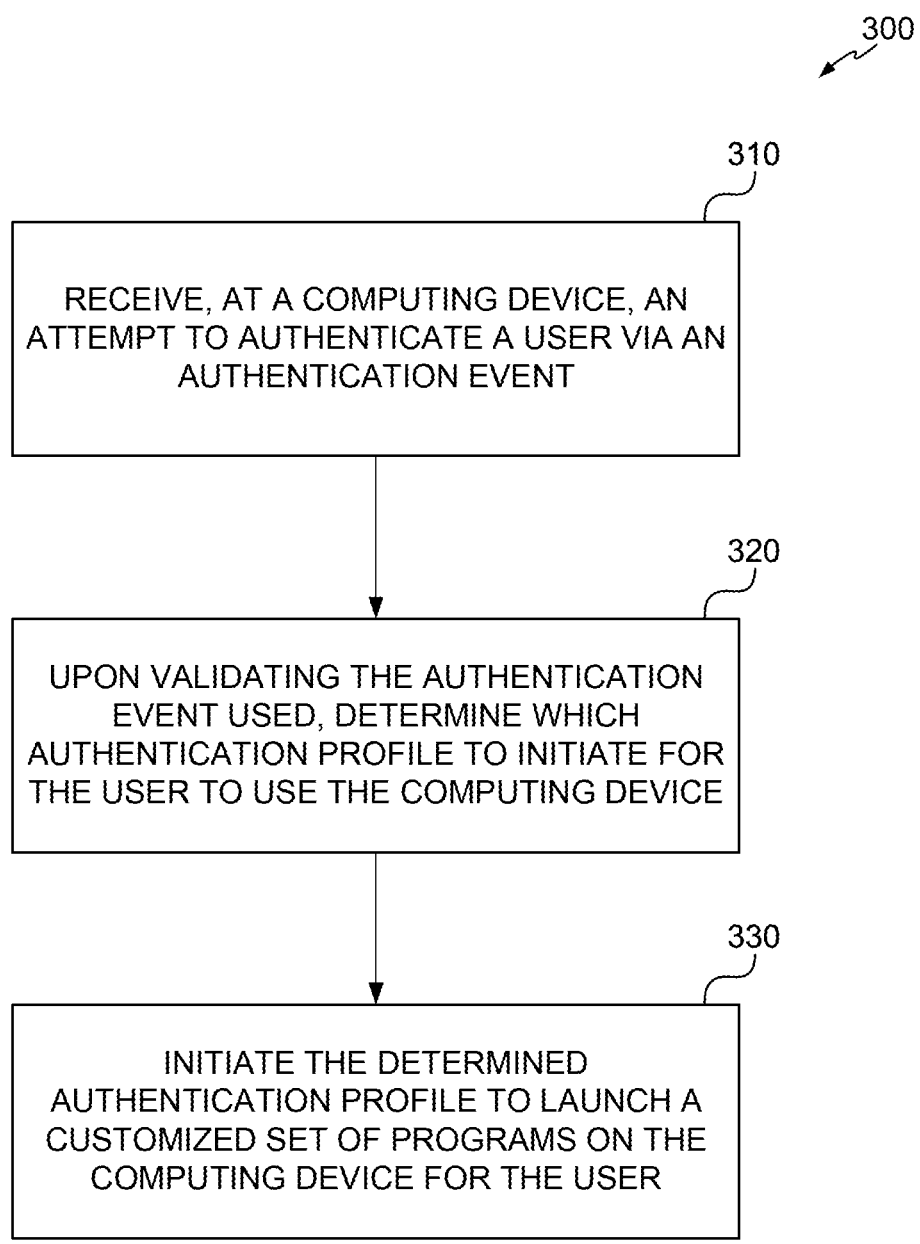
FIG. 3 is a flow diagram in accordance with an example of the present disclosure.

FIG. 3 is a flow diagram 300 of steps taken by a computing device to implement a method for authenticating a user via an authentication event, according to an example. Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 310, the computing device receives an attempt to authenticate a user via an authentication event. As described above, the computing device includes peripherals to authenticate the user via an authentication event corresponding to the peripheral used.

At 320, upon validating the authentication event use, the computing device determines which authentication profile to initiate for the user to use the computing device. As an example of determining which authentication profile to initiate, the computing device selects an authentication profile based on the authentication event used. For example, if the authentication event corresponds to an insertion or tap of a smart card, a first authentication profile may be initiated. If the authentication event corresponds to biometric identifiers, such as a fingerprint, facial recognition, or iris recognition, a second authentication profile may be initiated. If the authentication event corresponds to the use of an NFC capable device/card, a third authentication profile may be initiated.

At 330, the computing device initiates the determined authentication profile to launch a customized set of programs on the computing device for the user. As an example, a first authentication profile is initiated when a first authentication event is used, and a second authentication profile is initiated when a second authentication event is used. As a result, the customized set of programs launched when the first authentication profile is initiated may be different from the customized set of programs launched when the second authentication profile is initiated. As an example, for programs from the customized set of programs requiring authentication, the computing device passes through credentials for the first user to the programs requiring the authentication.

Once the customized set of programs or tasks are launched on the computing device, including the programs that require pass through credentials, the computing device is ready for use by the user, with the routine programs used by the user loaded. The computing device remains available for the user until the user authentication is revoked, as described above.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A method comprising:
receiving, at a computing device, an attempt to authenticate a first user via an authentication event;
upon validating the authentication event used, determining, based on the authentication event used, which authentication profile, from a plurality of authentication profiles of the first user, to initiate for the first user to use the computing device, wherein the determined authentication profile is a first authentication profile for the first user when a first authentication event is used and the determined authentication profile is a second authentication profile for the first user when a second authentication event is used; and
initiating the determined authentication profile to launch a customized set of programs on the computing device for the first user, wherein the customized set of programs includes at least one of an application, a remote session, or a website.

2. The method of claim 1, wherein the customized set of programs launched when the first authentication profile is initiated is different from the customized set of programs launched when the second authentication profile is initiated.

3. The method of claim 1, comprising:
receiving, at the computing device, an attempt to revoke user authentication; and
upon receiving the attempt to revoke the user authentication, terminating the customized set of programs.

4. The method of claim 3, comprising, for programs from the customized set of programs requiring authentication, passing through credentials for the first user to the programs from the customized set of programs requiring the authentication after launching the customized set of programs on the computing device for use by the first user and prior to terminating the customized set of programs upon receiving the attempt to revoke the user authentication.

5. The method of claim 4, wherein terminating the customized set of programs comprises signing out of the programs from the customized set of programs requiring the authentication.

6. The method of claim 1, comprising:
receiving, at the computing device, an attempt to authenticate a second user via a third authentication event;
upon validating the third authentication event used, terminating the customized set of programs for the first user; and
launching a customized set of programs on the computing device for the second user, wherein the customized set of programs for the second user is different from the customized set of programs for the first user.

7. A computing device comprising:
a first peripheral to authenticate a user via a first authentication event;
a second peripheral to authenticate the user via a second authentication event different from the first authentication event; and
a processor to:
receive an attempt to authenticate the user via the first peripheral or the second peripheral;
upon validating the authentication event used, select an authentication profile to initiate for the user to use the computing device, based on the peripheral used;
initiate the selected authentication profile to launch a customized set of programs on the computing device for the user, wherein the customized set of programs includes a program requiring user credentials, wherein the selected authentication profile is a first authentication profile for the user when the first authentication event is used, and the selected authentication profile is a second authentication profile for the user when the second authentication event is used; and
pass user credentials for the user to the program requiring user credentials as part of launching the customized set of programs on the computing device for the user.

8. The computing device of claim 7, wherein the customized set of programs launched when the first authentication profile is initiated is different from the customized set of programs launched when the second authentication profile is initiated.

9. The computing device of claim 7, wherein the processor is to:
receive an attempt to revoke user authentication; and
upon receiving the attempt to revoke the user authentication, terminate the customized set of programs.

10. A non-transitory computer-readable storage medium comprising program instructions which, when executed by a processor, cause the processor to:
receive, at a computing device, an attempt to authenticate a user via an authentication event;
upon validating the authentication event used, determine which authentication profile to initiate for the user to use the computing device based on the authentication event, wherein the determined authentication profile is a first authentication profile for the user when a first authentication event is used, and the determined authentication profile is a second authentication profile for the user when a second authentication event is used;
initiate the determined authentication profile to launch a customized set of programs on the computing device for the user;
after initiating the determined authentication profile,
receive an attempt to revoke user authentication for the user at the computing device; and
upon receiving the attempt to revoke the user authentication for the user, terminate the customized set of programs, wherein terminating the customized set of programs includes at least one of clearing a website browsing history or deleting temporary files.

11. The non-transitory computer-readable storage medium of claim 10, wherein for programs from the customized set of programs requiring user credentials, comprising program instructions which, when executed by the processor, cause the processor to pass through an authentication token for the user to the programs requiring the user credentials after the authentication profile is initiated.

12. The non-transitory computer-readable storage medium of claim 11, wherein the program instructions to cause the processor to terminate the customized set of programs comprises program instructions to cause the processor to sign out of the programs from the customized set of programs requiring the user credentials.

13. The computing device of claim 9, wherein the first peripheral receives the attempt to authenticate the user as a first instance of the first authentication event for the user and the first peripheral receives the attempt to revoke the user authentication as a second instance of the first authentication event for the user, wherein the processor terminates the customized set of programs in response to the second instance of the first authentication event for the user.

14. The method of claim 3, wherein terminating the customized set of programs includes clearing a website browsing history, clearing an application history, and deleting temporary files.

* * * * *